US011339822B2

(12) United States Patent
Grubert et al.

(10) Patent No.: US 11,339,822 B2
(45) Date of Patent: May 24, 2022

(54) ASSEMBLY LOCKING DEVICE, THREAD BOLT WITH ASSEMBLY LOCKING DEVICE, A COMPONENT WITH INSTALLED THREAD BOLT AS WELL AS A MANUFACTURING METHOD FOR THE ASSEMBLY LOCKING DEVICE AND AN ASSEMBLY METHOD OF THE THREAD BOLT WITH ASSEMBLY LOCKING DEVICE

(71) Applicant: Böllhoff Verbindungstechnik GmbH, Bielefeld (DE)

(72) Inventors: Klaus-Friedrich Grubert, Bückeburg (DE); André Röhr, Herford-Elverdissen (DE); Helmut Schäfer, Kernen (DE); Rayk Gutsche, Stuttgart (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 0 days.

(21) Appl. No.: 17/190,829

(22) Filed: Mar. 3, 2021

(65) Prior Publication Data
US 2021/0277929 A1 Sep. 9, 2021

(30) Foreign Application Priority Data
Mar. 4, 2020 (DE) .......................... 102020105838.1

(51) Int. Cl.
*F16B 39/20* (2006.01)
(52) U.S. Cl.
CPC .................... *F16B 39/20* (2013.01)
(58) Field of Classification Search
CPC ................................ F16B 39/20; F16B 37/12
(Continued)

(56) References Cited

U.S. PATENT DOCUMENTS 513,884 A * 1/1894 Cole ...................... F16B 39/12
411/222
556,082 A * 3/1896 Boeddinghaus ........ F16B 37/12
52/705
(Continued)

FOREIGN PATENT DOCUMENTS

CN 1162073 A 10/1997
CN 104541072 A 4/2015
(Continued)

OTHER PUBLICATIONS

English Translation, EP Extended Search Report for EP Application No. 21156039.6 dated Jul. 16, 2021, (5 pages).
(Continued)

*Primary Examiner* — Flemming Saether
(74) *Attorney, Agent, or Firm* — Reising Ethington P.C.; Matthew J. Schmidt (57) ABSTRACT

An assembly locking device adapted to a normalized standard or fine thread of a thread shaft of a thread bolt, so that the locking device is positionable in a loss-proof manner on the thread of the thread shaft. The locking device includes: a cylindrical turn comprised of a plurality of helically wound turns, of a wire, a transition turn and adjacent to the second end of the helix is a blocking turn which has a negative pitch $P_B$ compared to the holding turn, so that at least an end portion of the blocking turn is elastically displaceable in the axial direction of the central longitudinal axis between an insertion position and a blocking position. The end portion of the blocking turn forms the second end of the helix and in the blocking position is arranged radially outwardly of the transition turn and/or the holding turn.

20 Claims, 9 Drawing Sheets

(58) Field of Classification Search
USPC .......................................... 411/250–252, 438
See application file for complete search history.

(56) References Cited

U.S. PATENT DOCUMENTS

| | | | | |
|---|---|---|---|---|
| 1,347,294 | A * | 7/1920 | Sawtell | .................... F16B 39/20 |
| | | | | 411/251 |
| 3,373,647 | A | 3/1968 | Sherock | |
| 3,565,149 | A | 2/1971 | Wetzel | |
| 8,899,896 | B1 | 12/2014 | Campau | |
| 8,931,991 | B2 * | 1/2015 | Grubert | ............. B29C 45/14065 |
| | | | | 411/262 |
| 9,464,659 | B2 | 10/2016 | Schwarzbich | |
| 2002/0048499 | A1 | 4/2002 | Hoffmann | |
| 2007/0140810 | A1 * | 6/2007 | Itou | .......................... F16B 39/34 |
| | | | | 411/251 |
| 2010/0028103 | A1 * | 2/2010 | Soeda | .................... F16B 39/20 |
| | | | | 411/530 |
| 2011/0176887 | A1 | 7/2011 | Im | |

FOREIGN PATENT DOCUMENTS

| | | |
|---|---|---|
| DE | 102016124716 A1 | 6/2018 |
| EP | 2119921 A1 | 11/2009 |
| JP | H0674226 A | 3/1994 |
| JP | 2002333005 A | 11/2002 |
| JP | 2015145722 A | 8/2015 |
| WO | WO2011090234 A1 | 7/2011 |
| WO | WO2018155466 A1 | 8/2018 |
| WO | WO2020016885 A1 | 1/2020 |

OTHER PUBLICATIONS

EP Extended Search Report for EP Application No. 21156039.6 dated Jul. 16, 2021, (5 pages).
Clearance Holes for Bolts and Screws, DIN EN 20 273, Feb. 1992 (6 pages).
ISO Metric Screw Threads; 1 mm to 300 mm Diameter Coarse and Fine Pitch Threads; Selected Diameters and Pitches DIN 13-12, Oct. 1988 (5 pages).
ISO General Purpose Metric Screw Threads—Part 1: Nominal Sizes for Coarse Pitch Threads, DIN 13-1, Nov. 1999 (4 pages).
ISO General Purpose Metric Screw Threads—Part 2: Nominal Sizes for Fine Pitch Threads, DIN 13-2, Nov. 1999 (5 pages).
Unified Inch Screw Threads; The American Society of Mechanical Engineers; Jan. 2003 (190 pages).
ISO General Purpose Metric Screw Threads—Part 4: Nominal Sizes for Fine Pitch Threads, DIN 13-4, Nov. 1999 (5 pages).
ISO Metric Size Threads, DIN 13-12, Oct. 1988 (5 pages).
CN Office Action for CN Application No. 202110241087.1 dated Mar. 18, 2022 (10 pages).

* cited by examiner

ASSEMBLY LOCKING DEVICE, THREAD BOLT WITH ASSEMBLY LOCKING DEVICE, A COMPONENT WITH INSTALLED THREAD BOLT AS WELL AS A MANUFACTURING METHOD FOR THE ASSEMBLY LOCKING DEVICE AND AN ASSEMBLY METHOD OF THE THREAD BOLT WITH ASSEMBLY LOCKING DEVICE

CROSS REFERENCE TO RELATED APPLICATIONS

This application claims the priority of German patent application No. DE102020105838.1, filed on Mar. 4, 2020, and the content of this priority application is incorporated herein by reference in its entirety.

TECHNICAL FIELD

The present disclosure relates to an assembly locking device adapted to a normalized standard thread or coarse-pitch thread or a normalized fine thread or fine-pitch thread of a thread shaft of a thread bolt with a bolt head so that the assembly locking device is positionable on the standard thread RG or the fine thread FG of the thread shaft in a loss-proof manner and the thread bolt with the assembly locking device is arrangeable in a pull-out-proof manner inserted in a component opening. In addition, the present disclosure relates to a thread bolt with a thread shaft and a bolt head comprising a normalized standard thread RG or a normalized fine thread FG as well as an assembly locking device which is arranged on the thread shaft in a loss-proof manner. Furthermore, the present disclosure relates to a component with a passage hole which is round in cross-section and in which the thread bolt with assembly locking device is arranged. Finally, the present disclosure relates to a manufacturing method of the said assembly locking device as well as an assembly method of the thread bolt with assembly locking device in the passage hole of the component.

BACKGROUND

EP 2119921 A1 describes a connection locking device for a nut of a thread connection or for a component fastened by a thread bolt and a nut. Therefore, the nut is first fixed onto the thread bolt and the connection is established. This connection must not become loose due to vibrations or similar. The connection locking device is comprised of a spiral spring-like helix with two end sections which extend radially beyond the helix. After the nut has been screwed onto the thread bolt, this connection locking device is screwed onto the protruding thread shaft of the nut and then onto the thread bolt. One end section of the connection locking device is formed as a hook, which is bent in the direction of the other end of the spiral spring-like helix. The other end extends at a certain angle diagonally radially outwards with regard to the helix and beyond the outer side of the helix. The turns of the helix occupy the threads which a nut that has come loose would have to pass through. A nut moving onto or colliding with the helix presses the individual turns of the helix against each other, which causes them to block each other. In this way, the connection is locked.

A similar connection locking device is described in WO 2018/155466. The two ends of a spring-like spiral helix are also bent towards each other and partly overlap a neighboring turn. Thus, the turn facing the nut serves as a colliding turn, which slides onto the neighboring turns in a blocking manner. The turn facing away from the nut serves as a catch or collecting turn, in which neighboring turns, which are sliding over, block each other. Thus, this construction also serves as a connection locking device.

It is often the case, however, that two components are to be connected to each other by means of thread bolts in a position that is difficult to access. For this purpose, the two components to be connected to each other comprise a passage hole through which a thread bolt with thread shaft and bolt head must first be inserted in order to subsequently connect the two components to each other via a thread connection using the thread bolt. The poor accessibility of the connection point means that two passage holes must first be aligned with each other. Only then is it possible to insert a thread bolt through these holes with a thread shaft ahead in order to be able to fasten both components to each other via a thread connection. The alignment of the passage holes as well as the insertion of the thread bolt is often associated with high expenditure of time and errors during the assembly.

It is therefore the object of at least some implementations of the present disclosure to simplify such connection situations in such a manner that a connection between two components can be established with less time expenditure by means of a thread bolt within passage holes.

SUMMARY

The above object is solved by an assembly locking device, by a thread bolt with a thread shaft and a bolt head as well as an assembly locking device arranged on the thread shaft, a component with a passage hole of round cross-section in which the thread bolt with assembly locking device is arranged, as well as by a manufacturing method for the above assembly locking device and an assembly method for the above thread bolt with assembly locking device. Advantageous designs and further developments arise from the following description, the accompanying drawings as well as the appending claims.

The assembly locking device is adapted to a thread of a thread shaft of a thread bolt with a bolt head. Accordingly, the assembly locking device is positionable on the thread RG; FG of the thread shaft in a loss-proof manner and the thread bolt with the assembly locking device is arrangeable in a pull-out-proof manner inserted in a component opening. For this, the assembly locking device comprises the following features: a cylindrical helix comprised of a plurality of screw-like wound turns of a wire, which comprises a first end and a second end in the direction of inclination of the helix, starting at the first end of the helix at least one holding turn is provided, which extends over an angular range of more than 360° about a central longitudinal axis of the helix and has a positive pitch $P_H$ as well as an inner diameter $D_H$, adjoining the holding turn, a transition turn is provided which extends over an angular range of at least 65° about the central longitudinal axis of the helix and comprises a smaller pitch $P_U$ as well as an increasing inner diameter $D_U$ compared to the holding turn, and adjacent to the second end of the helix, a blocking turn is provided which extends over an angular range of at least 65° about the central longitudinal axis of the helix and comprises a negative pitch $P_B$ compared to the holding turn, so that at least an end portion of the blocking turn is elastically displaceable in the axial direction of the central longitudinal axis between an insertion position and a blocking position, wherein the end portion of the blocking turn forms the second end of the helix in the insertion position and is arranged radially outwardly of the transition turn and/or the holding turn in the blocking position.

The assembly locking device is a combination of functionally different turns in a single or common cylindrical helix. These functional turns are at least one holding turn, one transition turn and one blocking turn. Here, the term "turn" does not define the angular range over which the respective functional turn extends about the central longitudinal axis of the helix.

The assembly locking device with its various functional turns ensures that a thread bolt with bolt head is retained in a passage hole in the component in a pull-out-proof manner. This serves to prepare a connection to be made later with the thread bolt for fastening the component with passage hole. For this, the holding turn first realizes a reliable connection between the thread bolt and the assembly locking device. This is because the holding turn ensures that the assembly locking device is reliably retained in a non-positive or frictional manner in the thread or threads of the thread shaft of the thread bolt. The blocking turn on the other hand ensures that the thread bolt is retained in the passage hole. For this purpose, the blocking turn acts similar to a barb or barbed hook, as it allows an insertion of the thread bolt with assembly locking device into the passage hole against the direction of inclination of the bolt thread or the holding turn of the assembly locking device, while it counteracts an extraction of the thread bolt from the passage hole in the opposite direction or blocks this extraction. If an edge of the passage hole is moved past the blocking turn in the direction of inclination of the holding turn or the thread on the thread shaft, the edge displaces the blocking turn into the free thread of the thread shaft. Accordingly, the thread bolt with assembly locking device is receivable in the passage hole of the component. However, in the case of extraction of the thread bolt from the passage hole, the edge of the passage hole displaces the blocking turn onto the adjacent turn or turns of the helix arranged in the turn of the thread shaft. Due to this arrangement, the thread bolt with assembly locking device comprises a shaft outer diameter which is too large to pass through the passage hole in the direction of inclination of the holding turn or the thread on the bolt shaft and thereby prevents a passing through. Thus, the assembly locking device ensures an unhindered arrangement and a pull-out-proof retention of the thread bolt with assembly locking device in the passage hole of the component.

According to a further design of the assembly locking device, the wire of which comprises a wire diameter $D_{Draht}$ in the range of $$\sqrt{3} * \tfrac{7}{24} * P_{RG;FG} \leq D_{Draht} \leq \sqrt{3} \tfrac{7}{16} * P_{RG;FG}$$

wherein $P_{RG;\ FG}$ denotes a pitch of a thread RG; FG, which may be provided on the thread shaft of the thread bolt.

The assembly locking device is adapted such that it is arranged on a thread shaft of the thread bolt with a thread RG; FG. The thread may be a normalized standard thread or coarse-pitch thread RG or a normalized fine thread or fine-pitch thread FG, which are defined in different parts of the DIN standard DIN 13 in a publicly accessible manner. For the DIN standard DIN 13 there are analogous thread standards in other standard systems, which define the geometric thread data in the same way. This includes, for example, the US standard UTS (Unified Thread Standard). UTS specifies the shape, size gradation, tolerance, etc. for US inch threads. These include the US Unified Coarse Thread Series (UNC), which is measured in inches and comprises a flank angle of 60°. The corresponding fine thread is called UNF thread (Unified National Fine Thread Series). These are defined in ANSI/ASME B1.1.

Since the assembly locking device may be adapted to normalized standard threads or normalized fine threads, the wire diameter of the assembly locking device can be defined as a function of the respective pitch defined for the normalized standard thread or the normalized fine thread. This is because these normalized standard threads and the normalized fine threads define an angle of 60° in an outer thread at which adjacent thread flanks are arranged relative to one another. From this angle definition as well as other diameter data of the standard thread and fine thread, it can be derived which wire thickness the assembly locking device must comprise in order to be reliably arranged in the standard thread or fine thread of the thread shaft of the thread bolt. This is because the diameter of the wire of the assembly locking device determines how deep the wire of the assembly locking device is received in the respective thread of the thread shaft. If the wire is too thick, the assembly locking device will be displaced when the thread bolt is inserted into the passage hole on the thread shaft. Accordingly, the assembly locking device cannot fulfill its holding function, since it cannot be inserted through the passage hole together with the thread shaft. If the wire diameter is too small, i.e. lies below a lower limit, the wire of the holding turn and the blocking turn will sink too deeply into the thread of the thread bolt to be secured. This would make the outer diameter of the thread bolt and assembly locking device so small compared to the diameter of the passage hole in the component that the thread bolt with assembly locking device can be released from the passage hole. In this respect, the concrete definition of the wire diameter of the assembly locking device ensures that the assembly locking device can be reliably arranged on the thread shaft and can also realize its holding function within the passage hole of a component.

According to a further design of the assembly locking device, the holding turn comprises the inner diameter $D_H$ from the range $$d_{3,RG;FG} < D_H < d_{2,RG;FG}$$

wherein $d_{3,\ RG;\ FG}$ denotes a core diameter and $d_{2,\ RG;\ FG}$ denotes a flank diameter of the normalized standard thread RG or the normalized fine thread FG.

The holding turn of the assembly locking device may be adapted with regard to its inner diameter to the thread of the thread bolt. This is because the inner diameter of the holding thread determines the fastening of the assembly locking device on the thread shaft. Therefore, the inner diameter of the holding turn may be formed larger than or equal to a core diameter of the thread bolt, but not larger than the flank diameter of the normalized standard thread RG or the normalized fine thread FG on the thread shaft of the thread bolt. Due to this specific size adjustment of the inner diameter of the holding thread, it is ensured that the assembly locking device can be frictionally fastened on the bolt shaft. The specified size range of the inner diameter of the holding turn may emphasize in this context that a resilient effect of the assembly locking device and thus of the wire wound into a holding turn can compensate size tolerances between the holding turn and the thread shaft of the thread bolt.

The assembly locking device may be defined based on the known geometrical data of normalized standard threads and normalized fine threads. This is because the data specified in these known geometric data of normalized standard threads and fine threads, such as the pitch of the respective thread, are used to wind or manufacture the assembly locking device. According to a further embodiment, the geometric data required for the assembly locking device for the normalized standard thread RG are defined in DIN standards DIN 13-1 and DIN 13-12, and the data required for the geometric data of the normalized fine thread FG are defined in DIN standards DIN 13-2 to DIN 13-12. These geometric data for the normalized standard thread RG and the geometric data for the normalized fine thread FG define the pitch $P_{RG;\,FG}$, the core diameter $d_{3,\,RG;\,FG}$ as well as the flank diameter $d_{2,\,RG;\,FG}$.

The assembly locking device may be adapted in its construction and size to thread bolts the thread shaft of which comprises a normalized standard thread RG or a normalized fine thread FG. Since the geometric data for such standard threads RG or such normalized fine threads FG are known based on the publicly accessible DIN standards, the construction of the assembly locking device is defined based on these known geometric data of the normalized threads. This is because the corresponding geometric data of the thread on the bolt shaft can be taken from the said DIN standards for the most varied size requirements or sizes of a thread bolt, so that an assembly locking device can be wound based on these geometric data.

According to a further design of the assembly locking device, the at least one holding turn and the transition turn are wound on block or block-wound so that turns adjacent to one another in the axial direction are at least partially in abutment with one another.

Block-winding the holding turn and the transition turn has the advantage that the adjacent turns of the cylindrical helix of the assembly locking device are in abutment with each other. This abutment prevents that multiple assembly locking devices may entangle in each other. This is because the block-winding prevents turns of a second assembly locking device from engaging in the spaces between the turns in the first assembly locking device and may become entangled therein. At the same time, due to the spring force of the wound wire of the assembly locking device, the block-winding ensures that the assembly locking device can be arranged in the thread of the thread bolt in order to realize its function there.

According to another design, the transition turn and the blocking turn extend over an angular range of 150° to 300° about the central longitudinal axis of the helix of the assembly locking device, may be over an angle of 225°. This size setting of the transition turn and the blocking turn has been found to be advantageous in order to ensure a reliable retention and function of the assembly locking device on the thread bolt.

The present disclosure further comprises a thread bolt having a thread shaft and a bolt head comprising a normalized standard thread RG or a normalized fine thread FG, as well as an assembly locking device according to one of the designs described above, which may be arranged in a loss-proof manner on the thread shaft of the thread bolt with the second end of the cylindrical helix adjacent to the bolt head.

According to a further design of the thread bolt with assembly locking device, the normalized standard thread RG or the normalized fine thread FG on the thread shaft is defined by the normalized nominal diameter $d_{RG;\,FG}$ and the normalized pitch $P_{RG;\,FG}$ and the thread shaft, in combination with the assembly locking device, comprises an assembled outer diameter $d_M$ in the range of $$d_M = d_{RG;FG} - \tfrac{7}{8}\sqrt{3} * P_{RG;FG} + 3 * D_{Draht}$$

wherein the wire diameter $D_{Draht}$ of the assembly locking device is within the range of $$\sqrt{3} * \tfrac{7}{24} * P_{RG;FG} \leq D_{Draht} \leq \sqrt{3} \tfrac{7}{16} * P_{RG;FG}$$

The thread bolt in combination with the assembly locking device may comprise a defined outer diameter $d_M$. This is because such a definition of the outer diameter forms the basis for being able to adapt or adjust the thread bolt with assembly locking device and the passage hole in the component to one another. This is the only way to ensure that the inner diameter of the passage hole in the component, in which the thread bolt is to be retained in a pull-out-proof manner by the assembly locking device, is provided in a suitable size. Based on this, the outer diameter $d_M$ of the thread bolt and assembly locking device is determined by the geometric data of the normalized thread on the thread shaft defined above as well as the geometric data of the assembly locking device.

According to another design, a wire of the assembly locking device is received so deep in radial direction in a thread valley of the thread bolt that a center of the wire of the assembly locking device is arranged at most at a level of thread tips of the thread bolt which are arranged directly opposite to each other or radially deeper in the thread valley.

The wire diameter of the assembly locking device may be adapted in size to the thread of the thread bolt. This means that the thread geometry in the existing thread valleys of the thread shaft provides a receiving space for the wire of the assembly locking device. This is because the assembly locking device, i.e. the section of wire extending there, is accommodated in the thread valleys to such a depth that the center of the wire is arranged at a maximum at the radial height of the adjacent thread tips or at a maximum at the height of an axially extending connecting line between two thread tips which are arranged adjacent to one another via a thread valley. In addition, the assembly locking device may be arranged deeper in the radial direction in the thread valley. By means of the geometric adaptation or adjustment between the wire diameter of the assembly locking device and the thread geometry, it may be ensured that the wire of the assembly locking device cannot be stripped by the edge of a component opening from the thread shaft or be axially displaced on it.

The present disclosure further comprises a component having a passage hole of round cross-section, in which the thread bolt with assembly locking device is arranged in a pull-out-proof manner according to the designs described above.

The component may comprise the passage hole with a hole diameter $D_L$ in the range of $$d_M < D_L \leq d_{RG;FG} - \tfrac{7}{8}\sqrt{3} * P_{RG;FG} + 4 * D_{Draht}$$

with $d_M$ as the assembled outer diameter in the range of $$d_M = d_{RG;FG} - \tfrac{7}{8}\sqrt{3} * P_{RG;FG} + 3 * D_{Draht}$$

wherein the wire diameter $D_{Draht}$ of the assembly locking device is in the range of $$\sqrt{3} * \tfrac{7}{24} * P_{RG;FG} \leq D_{Draht} \leq \sqrt{3} \tfrac{7}{16} * P_{RG;FG}$$

From the above formulary description of the dimensioning of the hole diameter $D_L$ of the passage hole, it can be seen that the hole diameter $D_L$ is defined in close adaptation with the outer diameter of the thread bolt with assembly locking device. Accordingly, the hole diameter $D_L$ must be larger than the outer diameter of the thread bolt with assembly locking device at the point where the assembly locking device is located on the thread shaft. However, since the blocking turn in superimposed arrangement on the transition turn and/or the holding turn realizes the above-described blocking turn of the assembly locking device in the passage hole of the component, the hole diameter $D_L$ of the passage hole is defined depending on the diameter of the wire of the assembly locking device. This is because this superimposed blocking turn alone ensures the pull-out safety of the thread bolt with assembly locking device from the passage hole. For an additional understanding of the construction described, reference may be made to DIN EN 20273. This describes passage holes for screws in the components. Accordingly, DIN EN 20273 is incorporated by reference with regard to the dimensioning of passage holes.

According to another embodiment, the component is fastened to a further component by means of the thread bolt with assembly locking device. For this purpose, the further component comprises a passage hole through which the thread bolt passes in order to be fastened with a nut. According to an alternative design, the further component comprises a thread opening or a thread flange each with an inner thread matching the thread bolt. The thread bolt with assembly locking device is fastened in this thread opening or in this thread flange.

The above nut or thread opening or thread flange may comprise an entry chamfer. The entry chamfer may enlarge a diameter of an entry opening of the thread opening, the nut or the thread flange. The clearance provided in the entry chamfer may serve to receive the assembly locking device in the established connection between the components, so that the assembly locking device is not squeezed in a parting gap between the component and another component and does not interfere with this connection. At the component or at the component and at the further component the receiving recess for the assembly locking device may be provided by the entry chamfer.

The present disclosure further comprises a manufacturing method of an assembly locking device, in particular the assembly locking device according to the embodiments described above, which comprises the following steps: winding a wire into a cylindrical helix comprised of a plurality of helically wound turns of the wire, wherein a cylindrical helix comprised of a plurality of helically wound turns of a wire is formed, comprising a first end and a second end in the pitch direction of the helix, starting at the first end of the helix, at least one holding turn is wound which extends over an angular range of greater than 360° about a central longitudinal axis of the helix and comprises a positive pitch $P_H$ as well as an inner diameter $D_H$, following the holding turn, a transition turn is wound which extends over an angular range of at least 65° about the central longitudinal axis of the helix and comprises a smaller pitch $P_U$ as well as an increasing inner diameter $D_U$ compared to the holding turn, and adjacent to the second end of the helix, a blocking turn is wound which extends over an angular range of at least 65° about the central longitudinal axis of the helix and comprises a negative pitch $P_B$ compared to the holding turn so that at least an end portion of the blocking turn is elastically displaceable in the axial direction of the central longitudinal axis between an insertion position and a blocking position, wherein the end portion of the blocking turn forms the second end of the helix in the insertion position and is arranged radially outwardly of the transition turn and/or the holding turn in the blocking position.

In addition, the present disclosure comprises an assembly method of a thread bolt with an assembly locking device according to above embodiments in a passage hole of a component, which is also described above. This assembly method comprises the following steps:

inserting the thread bolt with assembly locking device into the passage hole of the component, with an end portion of the blocking turn forming the second end of the helix adjacent to the bolt head, and springing back resiliently of at least an end portion of the blocking turn towards the first end of the helix so that the end portion of the blocking turn is arranged radially outwardly of the transition turn and/or the holding turn.

BRIEF DESCRIPTION OF THE DRAWINGS

The embodiments of the present disclosure are explained in more detail with reference to the accompanying drawings. Showing.

DETAILED DESCRIPTION

Figure 1:
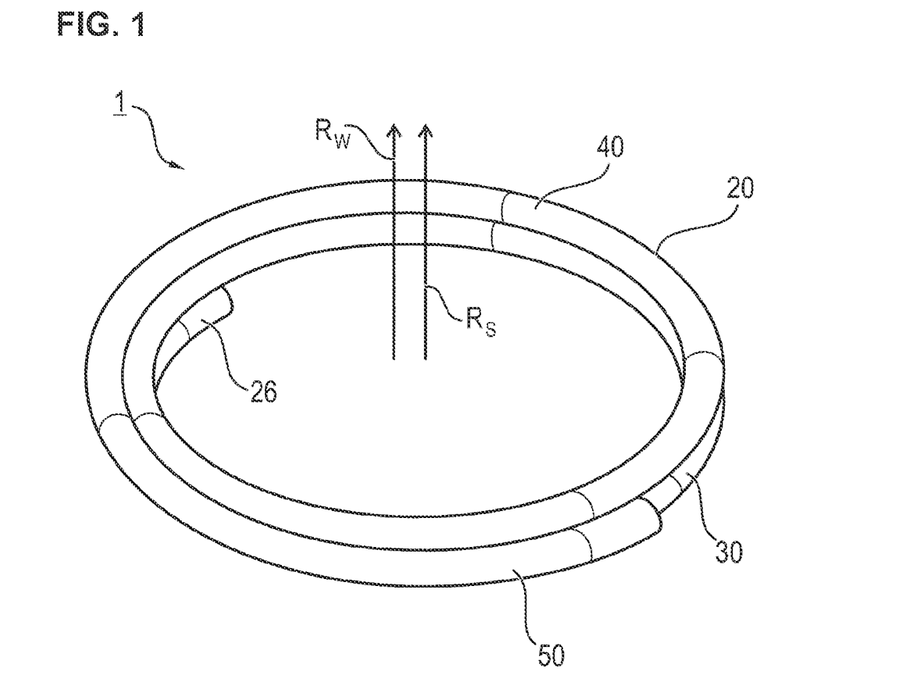
FIG. 1 a perspective view of an embodiment of the assembly locking device.
Figure 2:
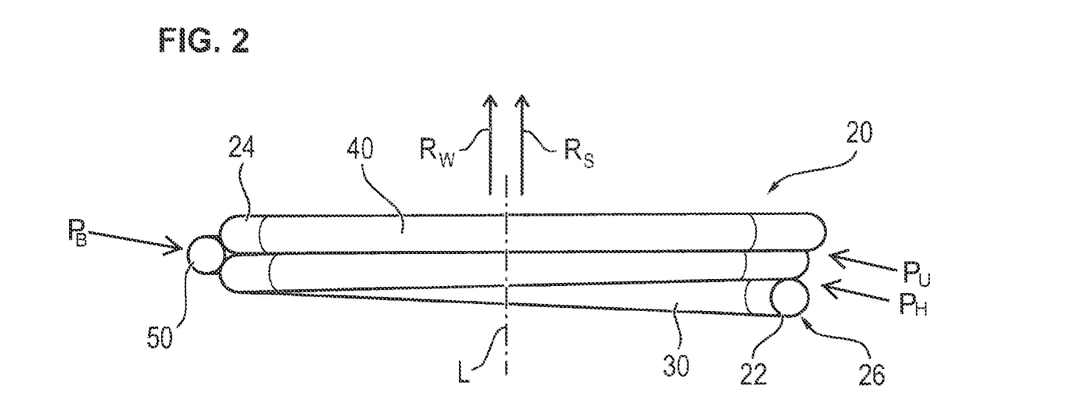
FIG. 2 a side view of the assembly locking device of FIG. 1.
Figure 3:
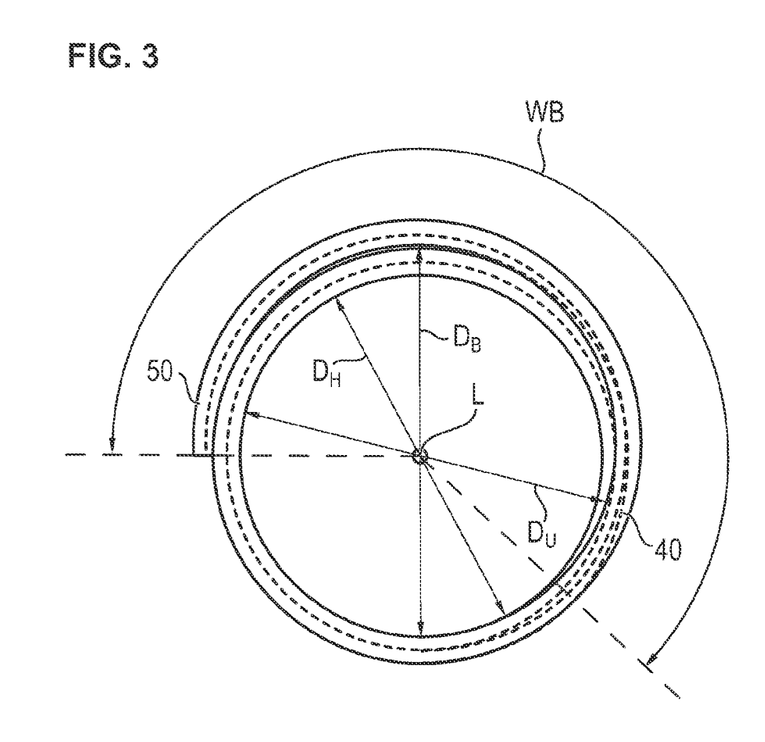
FIG. 3 a top view of an embodiment of the assembly locking device.
Figure 4:
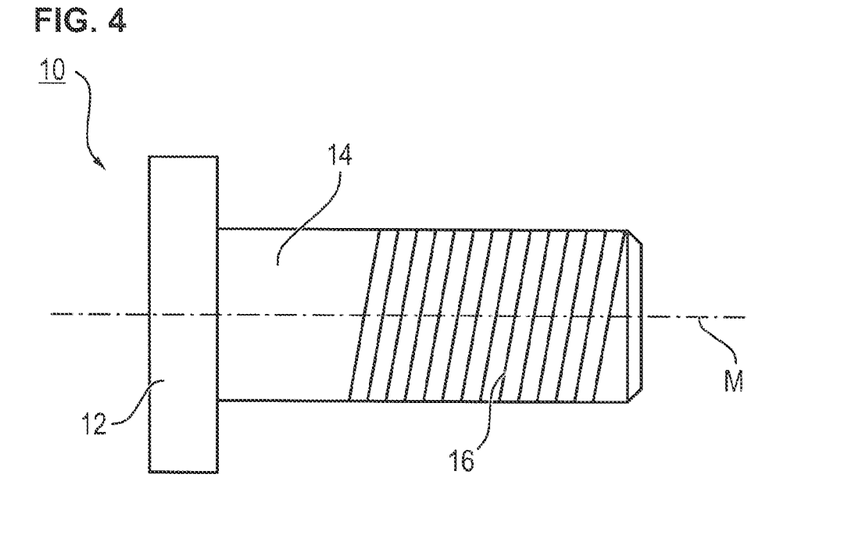
FIG. 4 a lateral sectional view of the thread bolt.

In FIGS. 1 to 3, various views of an embodiment of the assembly locking device 1 are shown. The assembly locking device 1 may be adapted to be arranged on a thread bolt 10 having a bolt head 12, a thread shaft 14 and a standard thread 16 (see FIG. 4). The standard thread 16, which can be right-handed or left-handed, is a normalized standard thread RG or a normalized fine thread FG. The geometric data of the normalized standard thread 16 are defined in known DIN standards, so that the assembly locking device 1 may be provided on the basis of the normalized geometric data.

The geometric data of the normalized standard thread RG, which may be also referred to as nominal dimensions, are specified in the DIN standards DIN 13-1 and DIN 13-12. The geometric data describing the normalized standard thread RG include the nominal diameter $d_{RG}$, the pitch $P_{RG}$, the flank diameter $d_{2, RG}$ and the core diameter $d_{3, RG}$. These geometrical data also define a normalized fine thread FG. As an example, Table 1 shows an extract of the geometric data for the standard thread RG according to DIN 13-1. In Table 1, a portion for the nominal diameter $d_{RG}$ of 1 mm≤$d_{RG}$≤18 mm is defined in combination with values for the pitch $P_{RG}$ in the range of 0.25 mm≤$P_{RG}$≤2.5 mm.

In addition, Table 2 shows an extract of the geometric data for the fine pitch thread FG according to DIN 13-4. Table 2 refers only to values of the nominal diameter $d_{FG}$, the flank diameter $d_{2, FG}$ and the core diameter $d_{3, FG}$ for a pitch $P_{FG}$ of 0.75 mm.

For the definition and explanation of the standard thread RG, reference is made to DIN 13-1 and DIN 13-12 and these are incorporated by this reference. The same applies to the geometric data of the fine thread FG, for which reference is made to DIN standards DIN 13-2 to DIN 13-12 and these are herewith incorporated by this reference.

TABLE 1

Geometric data for a standard thread RG of thread shaft 14 with different pitches $P_{RG}$ according to DIN 13-1 from 1999 (excerpt)

| nominal thread diameter $d_{RG}$ | | | pitch $P_{RG}$ | flank-diameter $d_{2, RG}$ | core diameter | | thread depth | | Curvature $R = \frac{H}{6}$ |
| --- | --- | --- | --- | --- | --- | --- | --- | --- | --- |
| row 1 | row 2 | row 3 | | | $d_{3, RG}$ | $D_3$ | $h_3$ | $H_1$ | |
| 1 | | | 0.25 | 0.838 | 0.893 | 0.729 | 0.153 | 0.135 | 0.036 |
| | 1.1 | | 0.25 | 0.938 | 0.793 | 0.629 | 0.153 | 0.135 | 0.036 |
| 1.2 | | | 0.25 | 1.038 | 0.893 | 0.929 | 0.153 | 0.135 | 0.036 |
| | 1.4 | | 0.3 | 1.205 | 1.032 | 1.075 | 0.184 | 0.162 | 0.043 |
| 1.6 | | | 0.35 | 1.373 | 1.171 | 1.221 | 0.215 | 0.189 | 0.051 |
| | 1.8 | | 0.35 | 1.573 | 1.371 | 1.421 | 0.215 | 0.189 | 0.051 |
| 2 | | | 0.4 | 1.740 | 1.509 | 1.567 | 0.245 | 0.217 | 0.058 |
| | 2.2 | | 0.45 | 1.908 | 1.648 | 1.713 | 0.276 | 0.244 | 0.065 |
| 2.5 | | | 0.45 | 2.208 | 1.948 | 2.013 | 0.276 | 0.244 | 0.065 |
| 3 | | | 0.5 | 2.675 | 2.387 | 2.459 | 0.307 | 0.271 | 0.072 |
| | 3.5 | | 0.6 | 3.110 | 2.764 | 2.850 | 0.368 | 0.325 | 0.087 |
| 4 | | | 0.7 | 3.545 | 3.141 | 3.242 | 0.429 | 0.379 | 0.101 |
| | 4.5 | | 0.75 | 4.013 | 3.580 | 3.688 | 0.460 | 0.406 | 0.108 |
| 5 | | | 0.8 | 4.480 | 4.019 | 4.134 | 0.491 | 0.433 | 0.115 |
| 6 | | | 1 | 5.350 | 4.773 | 4.917 | 0.613 | 0.541 | 0.144 |
| | 7 | | 1 | 6.350 | 5.773 | 5.917 | 0.613 | 0.541 | 0.144 |
| 8 | | | 1.25 | 7.188 | 6.466 | 6.647 | 0.767 | 0.677 | 0.180 |
| | | 9 | 1.25 | 8.188 | 7.466 | 7.647 | 0.767 | 0.677 | 0.180 |
| 10 | | | 1.5 | 9.026 | 8.160 | 8.376 | 0.920 | 0.812 | 0.217 |
| | | 11 | 1.5 | 10.026 | 9.160 | 9.376 | 0.920 | 0.812 | 0.217 |
| 12 | | | 1.75 | 10.863 | 9.853 | 10.106 | 1.074 | 0.947 | 0.253 |
| | 14 | | 2 | 12.701 | 11.546 | 11.835 | 1.227 | 1.083 | 0.289 |
| 16 | | | 2 | 14.701 | 13.546 | 13.835 | 1.227 | 1.083 | 0.289 |
| | 18 | | 2.5 | 16.376 | 14.933 | 15.294 | 1.534 | 1.353 | 0.361 | dimensions in mm'

Table 1: Geometric data for a standard thread RG of thread shaft 14 with different pitches $P_{RG}$ according to DIN 13-1 from 1999 (excerpt)

TABLE 2

Geometric data for a fine thread FG of thread shaft 14 with pitch $P_{FG}$ = 0.75 mm according to DIN 13-4 from 1999 (excerpt)

dimensions in mm'

| nominal thread diameter $d_{FG}$ | | | | flank diameter | core diameter | |
| --- | --- | --- | --- | --- | --- | --- |
| row 1 | row 2 | row 3 | row 4 | $d_{2, FG}$ | $d_{3, FG}$ | $D_1$ |
| | | | | | Maûe in Millimeter | |
| Gewinde-Nenndurchmesser $d_{FG}$ | | | | Flankendurchmesser | Kerndurchmesser | |
| Reihe 1 | Reihr 2 | Reihe 3 | Reihe 4 | $d_{2, FG}$ | $d_{3, FG}$ | $D_1$ |
| 5 | | | | 4.513 | 4.080 | 4.188 |
| | | 5.5 | | 5.013 | 4.580 | 4.688 |
| 6 | | | | 5.513 | 5.080 | 5.188 |
| | | 6.5 | | 6.013 | 5.580 | 5.688 |
| | 7 | | | 6.513 | 6.080 | 6.188 |
| | | | 7.5 | 7.013 | 6.580 | 8.688 |
| 8 | | | | 7.513 | 7.080 | 7.188 |
| | | 8.5 | | 6.013 | 7.580 | 7.688 |
| | | 9 | | 6.513 | 8.080 | 8.188 |
| | | | 9.5 | 9.013 | 8.580 | 8.688 |

TABLE 2-continued

Geometric data for a fine thread FG of thread shaft 14 with pitch $P_{FG}$ = 0.75 mm according to DIN 13-4 from 1999 (excerpt)

dimensions in mm'

| nominal thread diameter $d_{FG}$ | | | | flank diameter | core diameter | |
|---|---|---|---|---|---|---|
| row 1 | row 2 | row 3 | row 4 | $d_{2,FG}$ | $d_{3,FG}$ | $D_1$ |

Maße in Millimeter

| Gewinde-Nenndurchmesser $d_{FG}$ | | | | Flankendurchmesser | Kerndurchmesser | |
|---|---|---|---|---|---|---|
| Reihe 1 | Reihr 2 | Reihe 3 | Reihe 4 | $d_{2,FG}$ | $d_{3,FG}$ | $D_1$ |
| 10 | | | | 9.513 | 9.080 | 9.188 |
| | 10.5 | | | 10.013 | 9.580 | 9.688 |
| | | 11 | | 10.513 | 10.080 | 10.188 |
| | | 11.5 | | 11.013 | 10.580 | 10.688 |
| 12 | | | | 11.513 | 11.080 | 11.188 |
| | 12.5 | | | 12.013 | 11.580 | 11.688 |
| | | 13 | | 12.513 | 12.080 | 12.188 |
| | | 13.5 | | 13.013 | 12.550 | 12.688 |
| | 14 | | | 13.513 | 13.080 | 13.188 |
| | | 14.5 | | 14.013 | 13.580 | 13.688 |
| | | 15 | | 14.513 | 14.080 | 14.188 |
| 16 | | | | 15.513 | 15.080 | 15.188 |
| | | 17 | | 16.513 | 16.080 | 16.188 |
| | 18 | | | 17.513 | 17.080 | 17.188 |

Figure 5:
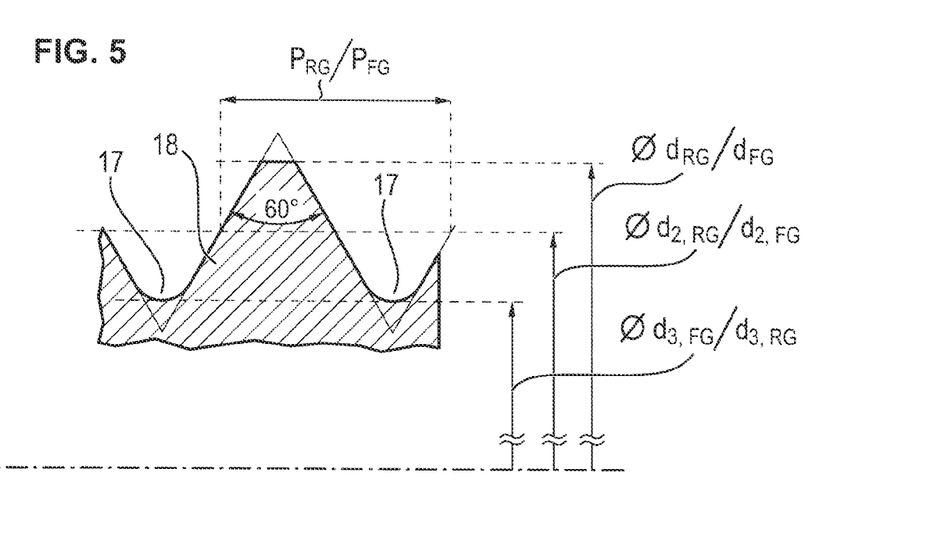
FIG. 5 a lateral sectional view of the geometrical data of an outer thread.
Figure 6:
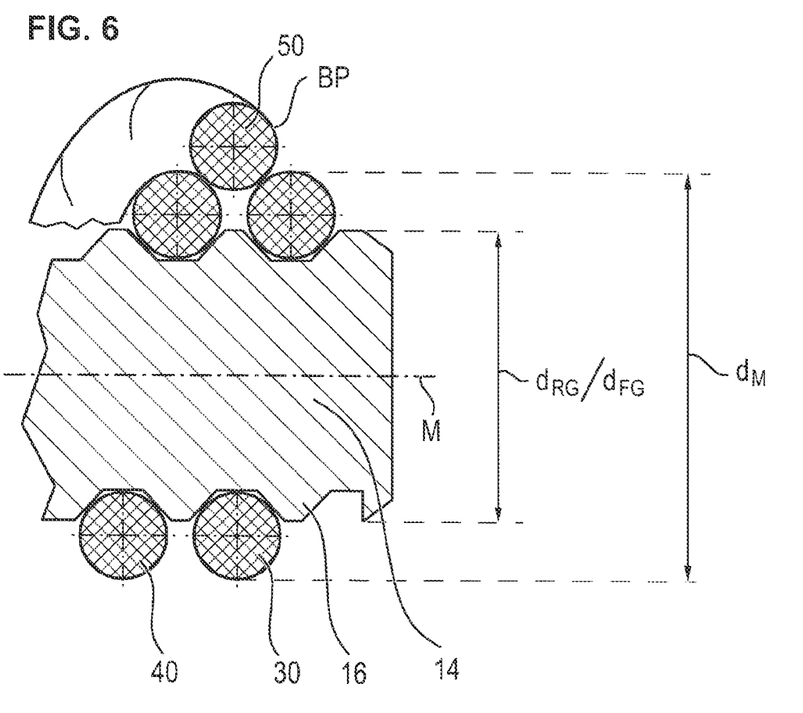
FIG. 6 a further lateral sectional view of a thread shaft of the thread bolt with an assembly locking device installed thereon, in which the blocking turn is in a blocking position, FIGS. 7a-d individual sequences of installation of the thread bolt with assembly locking device in a passage hole of a component as well as the retention of the thread bolt with assembly locking device in the passage hole after installation with the aid of the assembly locking device, FIG. 8 an illustration of geometrical data relating to the position of the wire of the assembly locking device in the thread of the thread shaft, FIG. 9 a component with a passage hole in which the thread bolt with assembly locking device is insertable and arrangeable in a pull-out-proof manner, FIG. 10 a schematic view of a component with a passage hole, in which the thread bolt with assembly locking device is arranged in a pull-out-proof manner, and a further component with a thread flange for screwing in and fastening the thread bolt, wherein the assembly locking device is receivable in an entry chamfer of the thread flange in the fastened state of the component on the further component, FIG. 11 a flow chart of an embodiment of the manufacturing method of the assembly locking device, and FIG. 12 a flow chart of an embodiment of the installation method.

To illustrate the geometrical data relevant for the standard thread RG and the fine thread FG, FIG. 5 shows a partial section through an outer thread. Two adjacent thread valleys 17 are shown, which are separated from each other by a thread crest 18. The thread crest 18 is defined by two thread flanks arranged at an angle of 60° to each other. The thread flanks of each thread valley 17 facing each other are also arranged at an angle of 60° to each other. As can be seen from the dimensioning in FIG. 5, a section of a cut along the central line M of the thread shaft 14 is shown which, with reference to FIG. 4, lies above the central line M of the thread 16 of the thread shaft 14.

As shown in FIGS. 1 to 3, the assembly locking device 1 is comprised of a cylindrical helix 20. The cylindrical helix 20 is wound from a wire in a manufacturing method (step S1) in which a plurality of helically wound turns 30, 40, 50 are produced (step S1a).

The helix 20 comprises a first end 22 and a second end 24. The first end 22 may be arranged in a winding direction RW of the helix 20 or in a pitch direction RS of an initial turn 26 of the helix 20 at the beginning of the helix 20 (see FIGS. 1, 2). The turns of the helix 20 may be characterized by the fact that they extend continuously in a circular arc shape. This also may apply to the beginning and the end of the helix 20.

The cylindrical shape of the helix 20 results from the adaptation of the assembly locking device 1 to a thread bolt with a round shaft cross-section.

The wire from which the assembly locking device 1 may be wound comprises a round cross-section, as shown in FIGS. 1 to 3. A wire with an elliptical cross-section or a rhombic cross-section or a cross-section rounded on one side may be used. The different cross-sectional shapes are used in dependence thereon to increase a retention of the assembly locking device 1 on the thread 16 of the thread bolt 10.

The wire of the assembly locking device may be comprised of a spring-elastic material with sufficient tensile strength. In addition, it is suitable for winding several turns.

Starting at the first end 22 of the helix 20, at least one holding turn 30 is wound. The holding turn 30 has the function of reliably holding the assembly locking device 1 on the thread 16 of the thread bolt 10. Thus, the at least one holding turn 30 ensures the position of the assembly locking device 1 on the bolt shaft 14. Furthermore, the at least one holding turn 30 ensures a reliable connection between the assembly locking device 1 and the thread bolt 10, so that the thread bolt 10 is held in a pull-out-proof manner in a passage hole 72 of a component 70 (see below).

The at least one holding turn 30 extends about a central longitudinal axis L of the helix 20 in an angular range of at least 360°. Depending on the load on the assembly locking device 1, for example due to a weight of the thread bolt 10 or due to a pull-out load of the thread bolt 10 at the passage hole 72 of the component 70, several holding turns 30 may be provided. The holding turn 30 may extend over an angular range selectable from 360° up to 720° or more. For example, such as 1.5 or 2 or 2.5 holding turns 30 are to be provided or wound starting at the first end 22 of the helix 20 (step S1b).

The at least one holding turn 30 may comprise a positive pitch $P_H$ as well as an inner diameter $D_H$. The choice of the pitch $P_H$ and the inner diameter $D_H$ ensure a reliable frictional connection or a reliable hold of the holding turn 30 and thus of the assembly locking device 1 on the thread 16 of the thread bolt 10.

Subsequently to the at least one holding turn 30 with positive pitch $P_H$, a transition turn 40 is wound (step S1c) or provided. The transition turn 40 may establish the cohesion and the transition between the holding turn 30 for the retaining or positioning function of the assembly locking device 1 (see above) and a blocking turn 50 for a blocking function or pull-out protection of the assembly locking device 1 with thread bolt 10 (see below).

The transition turn 40 may extend over an angular range which does not comprise a complete turn, i.e. 360°. According to a design of the present disclosure, the transition turn 50 extends in an angular range of at least 65° about the central longitudinal axis L of the helix 20. Since the blocking turn 50 is provided with a negative pitch $P_B$, the transition turn 40 initiates a pitch transition or a pitch change between the positive pitch $P_H$ of the holding turn 30 and the negative pitch $P_B$ of the blocking turn 50. The pitch $P_U$ of the transition turn 40 may be smaller than the pitch $P_H$ of the holding turn 30 and may be larger than the pitch $P_B$ of the blocking turn 50.

In addition, the transition turn 40 comprises an increasing inner diameter $D_U$ compared to the holding turn 30. The increasing inner diameter $D_U$ prepares or supports the blocking function of the blocking turn 50. This is because for the blocking function, the blocking turn 50 is arranged at least partially radially outside of at least the transition turn 40 and/or the holding turn 30 (see FIG. 3). As a result, the blocking turn 50 of the assembly locking device 1 may enlarge the outer diameter of the bolt shaft 14 beyond an inner diameter of a passage hole of a component in order to be able to retain the thread bolt 10 with assembly locking device 1 in the passage hole in a pull-out-proof and automatic manner.

Adjacent to the second end 24 of the helix 20 and following the transition turn 40, the blocking turn 50 may be wound and provided (step S1d). The blocking turn 50 extends over an angular range of at least 65° about the central longitudinal axis L of the helix 20. In addition, the blocking turn 50 is characterized by a negative pitch $P_B$ compared to the holding turn 30. The negative pitch $P_B$ of the blocking turn 50 may ensure a resilient, automatically acting, blocking function of the blocking turn 50. This is because the blocking turn 50 is arranged radially outside the holding turn 30 and/or the transition turn 40 due to the increasing inner diameter $D_U$ of the transition turn 40, which may increase due to a further increase in the inner diameter $D_B$ of the blocking turn 50. This creates the prerequisite for a resilient displacement of the blocking turn 50 in the direction of the central longitudinal axis L of the helix 20, which may be radially outwards from the remaining turns 30, 40 of the helix 20.

Accordingly, it may be possible to arrange the blocking turn 50 with respect to the central longitudinal axis L on the preceding turns 30, 40 or in the pitch direction of the holding turn 30 next to the preceding turns 30, 40. As an example, FIGS. 1 and 2 show an arrangement of the blocking turn 50 on the holding turn 30 and the transition turn 40. FIG. 3 shows the arrangement of the blocking turn 50 radially outwards from the holding turn 30 and the transition turn 40.

The negative pitch $P_B$ of the blocking turn 50 may specify that the blocking turn 50 is arranged radially outside and radially above the transition turn 40 or the transition turn 40 and the holding turn 30 (see FIGS. 1 and 2).

Due to the resilient properties of the wire of the assembly locking device 1, the blocking turn 50 can be resiliently displaced by an edge 74 of the passage hole 72 of a component 70 in the pitch direction $R_S$ of the holding turn 30 in order to spring back automatically to the position radially above the transition turn 40 or above the transition turn 40 and the holding turn 30 when the blocking turn 50 has been released again by the edge 74 of the passage hole 72. Thus, the blocking turn 50 is resiliently displaceable between the insertion position EP at the end 24 of the helix 20 and the blocking position BP radially above the holding turn 30 and the transition turn 40 (see FIG. 2). The insertion position EP, which designates the characteristic of the assembly locking device 1 on the bolt shaft 14 to be inserted into the passage hole 72 of the component 70, is explained with reference to FIG. 7b.

With reference to FIGS. 7a-d, a partial enlargement of the bolt shaft 14 with thread 16 is shown. On the thread 16, the assembly locking device 1 is arranged in such a manner that the blocking turn 50 faces the bolt head 12 and the holding turn 30 faces the component 70. Accordingly, the second end 24 of the helix 20 faces the bolt head 12.

Figure 7A:
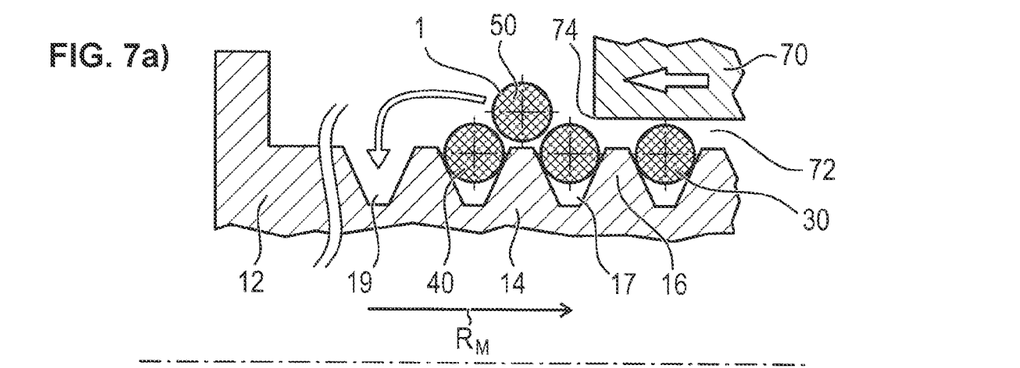
Figure 7B:
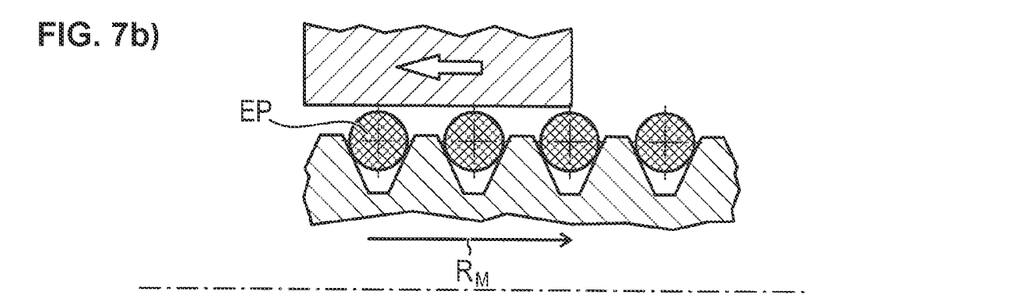

The assembly locking device 1 arranged on the thread 16 initially comprises the blocking turn 50 in a position radially above or radially outside the transition turn 40 and the holding turn 30, as shown in FIG. 7a. This position corresponds to the blocking position BP (see FIG. 7c). In addition, the blocking turn 50 is, when viewed in the axial direction of the thread bolt 10, positioned adjacent to occupied thread valleys 17.

If the thread bolt 10 with assembly locking device 1 is inserted into the passage hole 72 of the component 70 in the assembly direction $R_M$ (step M1), the edge 74 of the passage hole 72 of the component 70 moves towards the blocking turn 50 in the pitch direction $R_S$ of the holding turn 30 (see FIG. 7a). Since the blocking turn 50 can be displaced resiliently into the adjacent free thread valley 19 by the edge 74 (see FIG. 7b), the thread bolt 10 with assembly locking device 1 can be inserted into the passage hole 72 until the assembly locking device 1 has completely passed the passage hole 72 (see FIG. 7c).

Figure 7C:
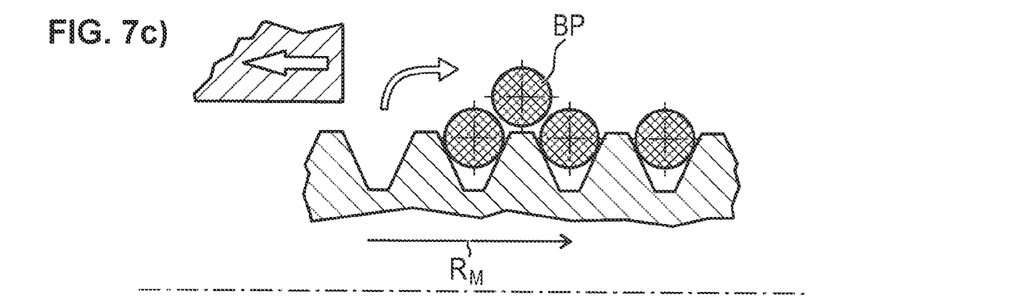
Figure 7D:
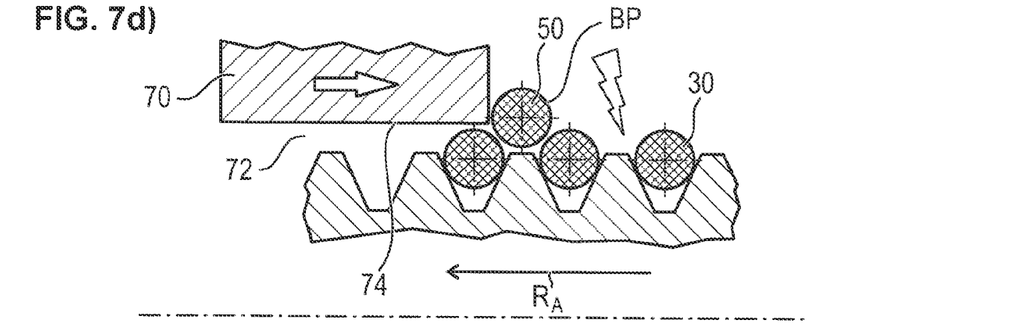

Since the edge 74 of the passage hole 72 no longer forces the blocking turn 50 into the free thread valley 19 after the assembly locking device 1 has been completely inserted into or has passed through the passage hole 72, the blocking turn 50 automatically springs back into its starting position according to FIG. 7c (step M2). Accordingly, as a result of this automatic process, which may form the basis for the blocking function of the assembly locking device 1, the blocking turn 50 is again arranged radially above occupied thread valleys 17 (see FIG. 7c). Thus, the pull-out-proofness of the thread bolt 10 with assembly locking device 1 from the passage hole 72 is ensured, since an inner diameter of the passage hole 72 is smaller than an outer diameter of the thread shaft 14 with the blocking turn 50 in its initial position.

If an attempt is made to remove the thread bolt 10 from the passage hole 72 of the component 70 in an extraction direction $R_A$ (see FIG. 7d), the blocking turn 50 prevents the extraction. This is because the edge 74 of the passage hole 72 displaces the blocking turn 50 in the direction of occupied thread valleys 17 on the bolt shaft 14 in the event of an attempted extraction of the thread bolt 10. It follows that the blocking turn 50 cannot escape into a free thread valley 19 in order to release the thread bolt 10 with assembly locking device 1 through the passage hole 72.

To facilitate the transport of a plurality of assembly locking devices 1 in a not yet installed state, the at least one holding turn 30 and the transition turn 40 may be block-wound or wound on block. Accordingly, turns 30, 40 which may be adjacent to each other are partially or fully radially adjacent to each other to form a closed cylindrical outer wall of the helix 20.

According to a further embodiment, the transition turn 40 and the blocking turn 50 may extend over an angular range WB of 150° to 300° about the central longitudinal axis L of the helix 20. An angle of 225° may be advantageous for this angular range WB (see FIG. 3).

The assembly locking device 1 may be arranged on the thread bolt 10, which comprises on its thread shaft 14 a normalized standard thread RG or a normalized fine thread FG according to the above geometric data of the DIN standards or related or analogous standards of other geometric systems.

Figure 8:
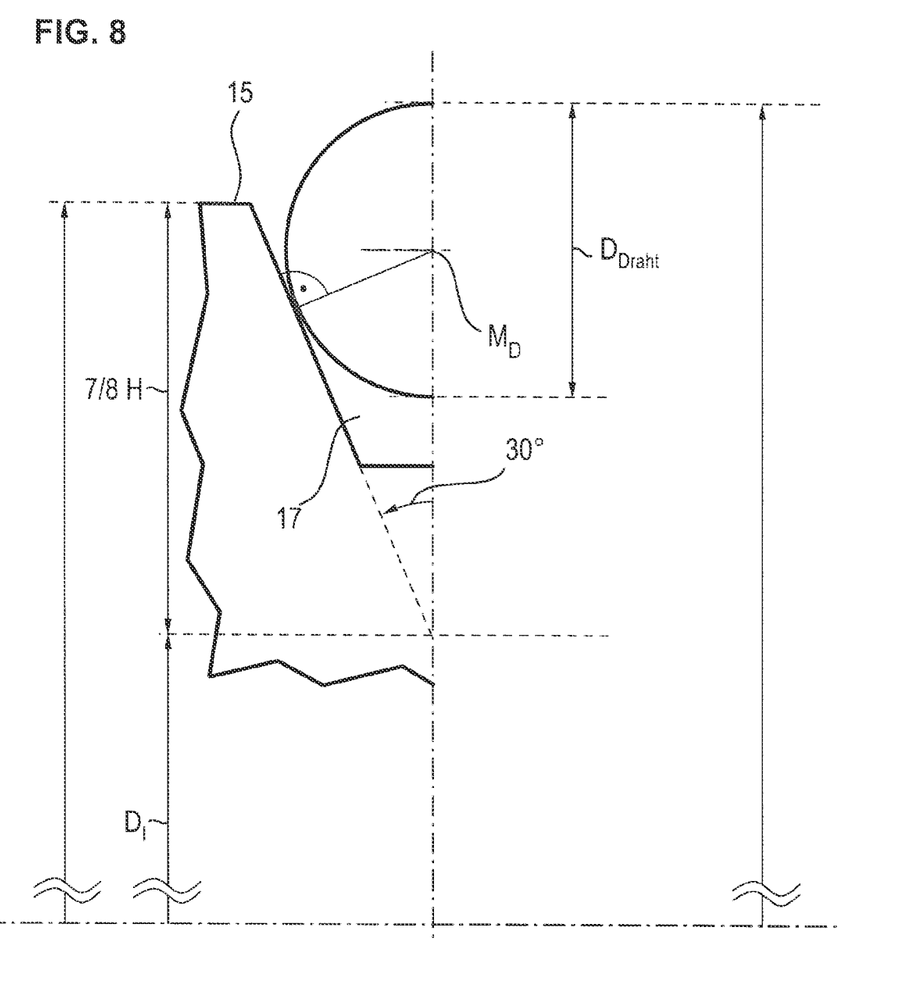
Figure 9:
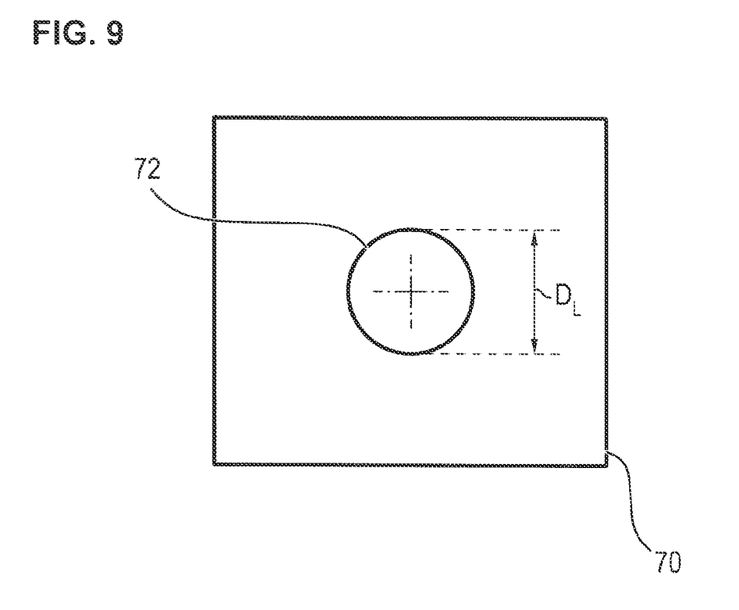

The known geometric data of the standard thread RG or the fine thread FG on the thread shaft 14 support a dimensioning of the diameter of the wire of the assembly locking device 1. It has proven to be advantageous that the wire diameter $D_{Draht}$ must be set such that just the holding turn 30 is reliably received in the thread valley 17 of the thread 16. Otherwise, there is a risk that the assembly locking device 1 will be loosened or stripped from the thread shaft 14. Therefore, the wire of the holding turn 30 may be arranged in a thread valley 17 of the thread 16 with its center point MD not arranged above the thread tips 15 of the thread 16. Accordingly, the distance between two thread flanks arranged opposite each other and forming a thread valley 17 at the thread tips 15, i.e. between two points on the thread flanks at the same radial distance from the central longitudinal axis M of the thread shaft 14, is greater than or equal to the wire diameter $D_{Draht}$. As a result, at least half of the wire cross-section is retained between the thread flanks, as shown schematically in FIG. 8. In other words, the wire of the assembly locking device 1 may be received so deeply in the radial direction in the thread valley 17 that the center point of the wire of the assembly locking device 1 is arranged at most at the level of the thread tips or radially deeper in the thread valley 17. The distance between the thread tips 15 at the thread flanks arranged opposite each other and forming a thread valley 17 may be greater than the wire diameter $D_{Draht}$, so that the wire blocks the thread valley 17 for receiving a wire turn and may project in the radial direction beyond the thread tips 15 only with a portion of ≤48%, with a portion in the range of 45% to 15% of the wire diameter $D_{Draht}$.

The other figures do not reflect this geometrical relationship, as they only schematically show the combination of the thread shaft and the assembly locking device.

Since the thread bolt 10 may comprise a normalized standard thread RG of the pitch $P_{RG}$ or a normalized fine thread FG of the pitch $P_{FG}$, this may result in a diameter range for the wire diameter $D_{Draht}$ according to $$\sqrt{3} * 7/24 * P_{RG;FG} \leq D_{Draht} \leq \sqrt{3} 7/16 * P_{RG;FG}$$

wherein PRG; FG denotes a pitch of a normalized standard thread RG or a normalized fine thread FG.

In addition, to wind the holding turn 30 with a defined inner diameter DH so that the retention on the thread shaft 14 may be ensured. Here, again, the inner diameter $D_H$ is defined with respect to the normalized geometric data of a standard thread RG or a fine thread FG (see above). This results in the following value range for the inner diameter $D_H$ $$d_{3,RG;FG} < D_H < d_{2,RG;FG}$$

wherein $d_{3, RG; FG}$ denotes a core diameter and $d_{2, RG; FG}$ denotes a flank diameter of the normalized standard thread RG or the normalized fine thread FG.

Assuming that the thread bolt 10 may comprise the normalized fine thread FG or the normalized standard thread RG, the thread 16 of the thread shaft 14 is defined by the normalized nominal diameters $D_{RG}$ or $D_{FG}$ as well as the normalized pitch $P_{RG}$ or $P_{FG}$. This results in an assembled outer diameter $d_M$ for the bolt shaft 14 with assembly locking device 1 arranged thereon according to $$d_M = d_{RG;FG} - 7/8\sqrt{3} * P_{RG;FG} + 3 * D_{Draht}$$

The wire diameter of the assembly locking device 1 is within the range of $$\sqrt{3} * 7/24 * P_{RG;FG} \leq D_{Draht} \leq \sqrt{3} 7/16 * P_{RG;FG}$$

From the above dimensions of the thread shaft 14 with assembly locking device 1, a diameter $D_L$ of the passage hole 72 of the component 70 results, in which the thread bolt 10 with assembly locking device 1 is held in a pull-out-proof manner. For the diameter $D_L$ of the passage hole 72, the following applies:

$$d_M < D_L \leq d_{RG;FG} - 7/8\sqrt{3} * P_{RG;FG} + 4 * D_{Draht}$$

with $d_M$ as the assembled outer diameter in the range of $$d_M = d_{RG;FG} - 7/8\sqrt{3} * P_{RG;FG} + 3 * D_{Draht}$$

wherein the wire diameter $D_{Draht}$ of the assembly locking device 1 is in the range of $$\sqrt{3} * 7/24 * P_{RG;FG} \leq D_{Draht} \leq \sqrt{3} 7/16 * P_{RG;FG}$$

Figure 10:
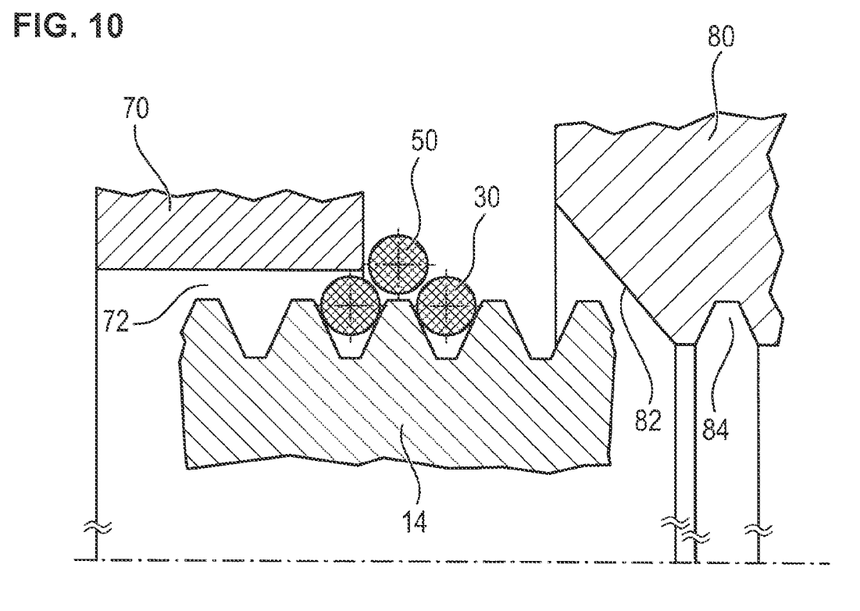
Figure 11:
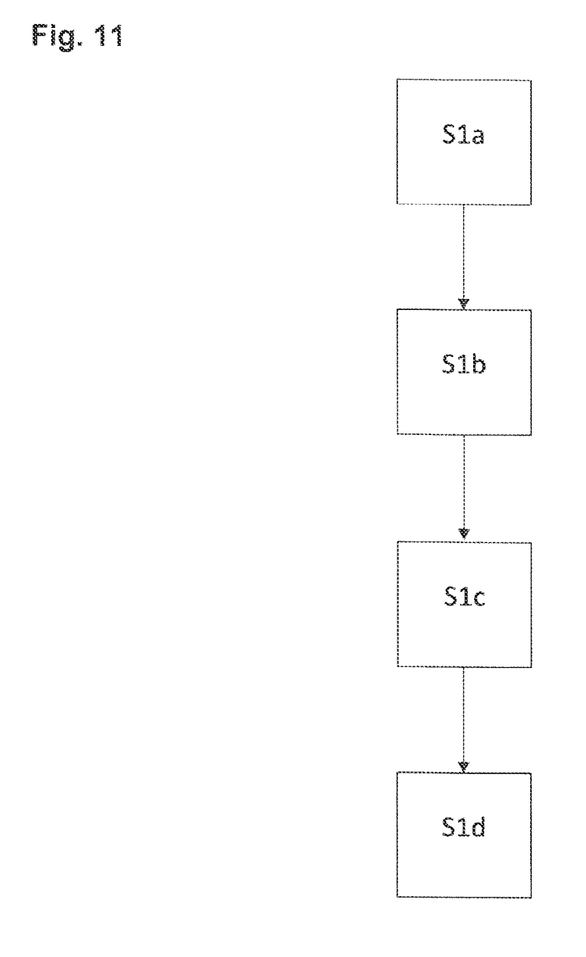
Figure 12:
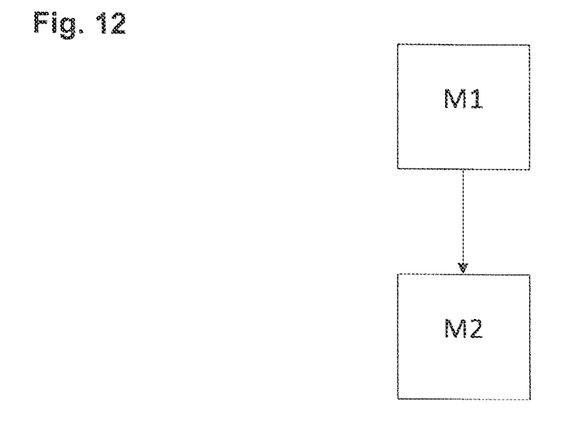

FIG. 10 shows a schematic illustration of a preliminary stage of a fastening situation of the component 70 to a thread flange 80 of a further component (not shown). This schematic illustration thus relates to the situation in which the thread bolt 70, which is held securely in the passage hole 72 of the component 70 by means of the assembly locking device 1, is to be fastened to at least one further component. For this purpose, the further component comprises a passage hole or thread flange 80. If only one passage hole is provided in the further component, the thread bolt 14 may be screwed to a nut (not shown). In this case, the nut comprises an entry chamfer into the thread opening as described in more detail below with respect to the thread flange 80. This entry chamfer provides a receiving volume for the assembly locking device 1 adjacent to an entry opening of the inner thread channel of the nut, so that the latter does not interfere with the connection to be made.

FIG. 10 schematically shows a further component with a thread flange 80, into the thread 84 of which the thread bolt 14 can be screwed and therefore the component 70 is fastenable to the further component. When the thread bolt 14 is screwed into the thread flange 80, the entry chamfer 82 receives the assembly locking device 1. In this way, it may be ensured that the assembly locking device is not clamped between the component 70 and a further component and does not interfere with the connection between these.

The further component is illustrated by reference sign 80. In this case, the further component 80 comprises a fastening opening having an inner thread 84 and an entry chamfer 82 adjacent to the entry of the fastening opening as viewed in the thread direction of the inner thread 84.

The invention claimed is:

1. An assembly locking device adapted to a thread of a thread shaft of a thread bolt with a bolt head, so that the assembly locking device is positionable on the thread of the thread shaft in a loss-proof manner and the thread bolt with assembly locking device is arrangeable in a pull-out-proof manner inserted in a component opening, wherein the assembly locking device comprises the following features:
   a. a cylindrical helix comprised of a plurality of helically wound turns of a wire, which comprises a first end and a second end,
   b. starting at the first end of the helix, at least one holding turn is provided, which extends over an angular range of greater than 360° about a central longitudinal axis of the helix and comprises a positive pitch $P_H$ as well as an inner diameter $D_H$, c. following the holding turn, a transition turn is provided which extends over an angular range of at least 65° about the central longitudinal axis of the helix and comprises a smaller pitch $P_U$ as well as an increasing inner diameter $D_u$ compared to the holding turn, and d. adjacent to the second end of the helix, a blocking turn is provided which extends over an angular range of at least 65° about the central longitudinal axis of the helix and comprises a negative pitch $P_B$ compared to the holding turn, so that at least an end portion of the blocking turn is elastically displaceable in the axial direction of the central longitudinal axis between an insertion position and a blocking position, wherein the end portion of the blocking turn forms the second end of the helix in the insertion position and is arranged at least partially radially outwardly of the transition turn and/or the holding turn in the blocking position.

2. The assembly locking device according to claim 1, the wire of which comprises a wire diameter $D_{Draht}$ in the range of $$\sqrt{3}*\tfrac{7}{24}*P_{RG;FG} \leq D_{Draht} \leq \sqrt{3}*\tfrac{7}{16}*P_{RG;FG}$$

wherein $P_{RG;\ FG}$ denotes a pitch of the thread.

3. The assembly locking device according to claim 2, in which the holding turn comprises the inner diameter $D_H$ in the range of $$d_{3,RG;FG} < D_H < d_{2,RG;FG}$$

wherein $d_{3,\ RG;\ FG}$ denotes a core diameter and $d_{2,\ RG;\ FG}$ denotes a flank diameter of the thread.

4. The assembly locking device according to claim 3, wherein the thread is a normalized standard thread RG or a normalized fine thread FG.

5. The assembly locking device according to claim 4, in which the at least one holding turn and the transition turn are wound on block so that turns adjacent to each other in the axial direction are abutting each other at least partially.

6. The assembly locking device according to claim 3, for which geometrical data of the normalized standard thread RG are defined in the DIN standards DIN 13-1 and DIN 13-12 and for which geometrical data of the normalized fine thread FG are defined in the DIN standards DIN 13-2 to DIN 13-12, wherein the geometrical data for the normalized standard thread RG and the geometrical data for the normalized fine thread FG define the pitch $P_{RG;\ FG}$, the core diameter $d_{3,\ RG;\ FG}$ and the flank diameter $d_{2,\ RG;\ FG}$.

7. The assembly locking device according to claim 2, wherein the thread is a normalized standard thread RG or a normalized fine thread FG.

8. The assembly locking device according to claim 7, in which the at least one holding turn and the transition turn are wound on block so that turns adjacent to each other in the axial direction are abutting each other at least partially.

9. The assembly locking device according to claim 2, for which geometrical data of the normalized standard thread RG are defined in the DIN standards DIN 13-1 and DIN 13-12 and for which geometrical data of the normalized fine thread FG are defined in the DIN standards DIN 13-2 to DIN 13-12, wherein the geometrical data for the normalized standard thread RG and the geometrical data for the normalized fine thread FG define the pitch $P_{RG;\ FG}$, the core diameter $d_{3,\ RG;\ FG}$ and the flank diameter $d_{2,\ RG;\ FG}$.

10. The assembly locking device according to claim 2, in which the transition turn and the blocking turn extend over an angular range of 150° to 300° about the central longitudinal axis of the helix.

11. The assembly locking device according to claim 1, wherein the thread is a normalized standard thread RG or a normalized fine thread FG.

12. The assembly locking device according to claim 11, in which the at least one holding turn and the transition turn are wound on block so that turns adjacent to each other in the axial direction are abutting each other at least partially.

13. The assembly locking device according to claim 1, for which geometrical data of the normalized standard thread RG are defined in the DIN standards DIN 13-1 and DIN 13-12 and for which geometrical data of the normalized fine thread FG are defined in the DIN standards DIN 13-2 to DIN 13-12, wherein the geometrical data for the normalized standard thread RG and the geometrical data for the normalized fine thread FG define the pitch $P_{RG;\ FG}$, the core diameter $d_{3,\ RG;\ FG}$ and the flank diameter $d_{2,\ RG;\ FG}$.

14. The assembly locking device according to claim 1, in which the transition turn and the blocking turn extend over an angular range of 150° to 300° about the central longitudinal axis of the helix.

15. A thread bolt with a thread shaft and a bolt head which comprises a thread as well as an assembly locking device according to claim 1, which is arranged in a loss-proof manner on the thread shaft with the second end of the cylindrical helix adjacent to the bolt head.

16. The thread bolt according to claim 15, on which the thread is defined as a normalized standard thread RG or a normalized fine thread FG on the thread shaft by the normalized nominal diameter $d_{RG;\ FG}$ and the normalized pitch $P_{RG;\ FG}$ and the thread shaft in combination with the assembly locking device comprises an assembled outer diameter $d_M$ $$d_M = d_{RG;FG} - \tfrac{7}{8}\sqrt{3}*P_{RG;FG} + 3*D_{Draht}$$

in which the wire diameter $D_{Draht}$ of the assembly locking device is within the range of $$\sqrt{3}*\tfrac{7}{24}*P_{RG;FG} \leq D_{Draht} \leq \sqrt{3}*\tfrac{7}{16}*P_{RG;FG}.$$

17. The thread bolt according to claim 16, in which a wire of the assembly locking device is received in a thread valley of the thread bolt so deep in a radial direction that a center point of the wire of the assembly locking device is arranged at most at a level of thread tips of the thread bolt which are arranged directly opposite to each other or radially deeper in the thread valley.

18. The thread bolt according to claim 15, in which a wire of the assembly locking device is received in a thread valley of the thread bolt so deep in a radial direction that a center point of the wire of the assembly locking device is arranged at most at a level of thread tips of the thread bolt which are arranged directly opposite to each other or radially deeper in the thread valley.

19. A component with a passage hole which is round in cross-section and in which the thread bolt with assembly locking device according to claim 15 is arranged in a pull-out-proof manner.

20. The component according to claim 19, in which the passage hole comprises a hole diameter $D_L$ in the range of $$d_M < D_L \leq d_{RG;FG} - \tfrac{7}{8}\sqrt{3}*P_{RG;FG} + 4*D_{Draht}$$

with $d_M$ as assembled outer diameter in the range of $$d_M = d_{RG;FG} - \tfrac{7}{8}\sqrt{3}*P_{RG;FG} + 3*D_{Draht}$$

wherein the wire diameter $D_{Draht}$ of the assembly locking device is in the range of $$\sqrt{3}*\tfrac{7}{24}*P_{RG;FG} \leq D_{Draht} \leq \sqrt{3}*\tfrac{7}{16}*P_{RG;FG}.$$

* * * * *